US011524455B2

(12) United States Patent
Zehavi et al.

(10) Patent No.: US 11,524,455 B2
(45) Date of Patent: *Dec. 13, 2022

(54) REMOVABLE UNIT FOR SELECTIVE POWDER DELIVERY FOR ADDITIVE MANUFACTURING

(71) Applicant: Applied Materials, Inc., Santa Clara, CA (US)

(72) Inventors: Raanan Zehavi, Sunnyvale, CA (US); Hou T. Ng, Campbell, CA (US); Nag B. Patibandla, Pleasanton, CA (US); Ajey M. Joshi, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/694,144

(22) Filed: Nov. 25, 2019

(65) Prior Publication Data

US 2021/0154930 A1 May 27, 2021

(51) Int. Cl.
| | |
|---|---|
| *B29C 64/255* | (2017.01) |
| *B29C 64/209* | (2017.01) |
| *B29C 64/25* | (2017.01) |
| *B29C 64/329* | (2017.01) |
| *B29C 64/227* | (2017.01) |

(Continued)

(52) U.S. Cl.
CPC ......... *B29C 64/255* (2017.08); *B29C 64/153* (2017.08); *B29C 64/209* (2017.08); *B29C 64/227* (2017.08); *B29C 64/245* (2017.08); *B29C 64/25* (2017.08); *B29C 64/264* (2017.08);

(Continued)

(58) Field of Classification Search
CPC .......... B22F 10/14; B22F 10/16; B22F 10/28; B29C 4/259; B29C 4/264; B29C 64/153; B29C 64/205; B29C 64/209; B29C 64/245; B29C 64/25; B29C 64/255;

(Continued)

(56) References Cited

U.S. PATENT DOCUMENTS 5,188,262 A * 2/1993 Fielding ................. A01C 15/10
222/189.02
6,092,941 A 7/2000 Imai
(Continued)

FOREIGN PATENT DOCUMENTS

| CN | 104708819 | 6/2015 |
|---|---|---|
| EP | 1631439 | 8/2007 |

(Continued)

*Primary Examiner* — Manley L Cummins, IV
(74) *Attorney, Agent, or Firm* — Fish & Richardson P.C.

(57) ABSTRACT

A dispensing system for an additive manufacturing includes a powder reservoir that contains powder to form an object, and an array of nozzles positioned at a base of the powder reservoir over a top surface of a platen where the object is to be formed. The powder flows from the powder reservoir through the nozzles to the top surface. A respective powder wheel in each nozzle controls a flow rate of the powder. Each wheel has multiple troughs on surface of the wheel. When a motor rotates the wheel, the troughs transport the powder through the nozzle. The rotation speed of the wheel controls the flow rate. For solid parts of the object, the wheel rotates and allows the powder to be deposited on the top surface. For empty parts of the object, the wheel remains stationary to prevent the powder from flowing to the surface.

18 Claims, 10 Drawing Sheets

(51) Int. Cl.
    *B29C 64/264*     (2017.01)
    *B29C 64/153*     (2017.01)
    *B29C 64/245*     (2017.01)
    *B33Y 40/00*     (2020.01)
    *B33Y 10/00*     (2015.01)
    *B33Y 30/00*     (2015.01)

(52) U.S. Cl.
    CPC ............ *B29C 64/329* (2017.08); *B33Y 10/00* (2014.12); *B33Y 30/00* (2014.12); *B33Y 40/00* (2014.12)

(58) Field of Classification Search
    CPC ... B29C 64/307; B29C 64/314; B29C 64/321; B29C 64/329; B29C 64/343; B33Y 30/00; B33Y 40/00
    See application file for complete search history.

(56) References Cited

U.S. PATENT DOCUMENTS

| | | | | |
|---|---|---|---|---|
| 7,828,022 | B2* | 11/2010 | Davidson | B29C 64/153 |
| | | | | 264/497 |
| 9,211,676 | B2 | 12/2015 | Hsieh | |
| 10,449,718 | B1* | 10/2019 | Stroud | B22F 12/63 |
| 10,960,605 | B2* | 3/2021 | Zehavi | B29C 64/336 |
| 2003/0074096 | A1 | 4/2003 | Das et al. | |
| 2005/0280185 | A1* | 12/2005 | Russell | B29C 64/165 |
| | | | | 425/375 |
| 2007/0179656 | A1 | 8/2007 | Eshed et al. | |
| 2011/0300248 | A1* | 12/2011 | Tung | B29C 64/329 |
| | | | | 425/90 |
| 2013/0001834 | A1 | 1/2013 | El-Siblani et al. | |
| 2014/0175708 | A1 | 6/2014 | Echigo et al. | |
| 2015/0174824 | A1 | 6/2015 | Gifford et al. | |
| 2015/0367415 | A1 | 12/2015 | Buller et al. | |
| 2016/0311164 | A1* | 10/2016 | Miyano | B33Y 30/00 |
| 2017/0021456 | A1 | 1/2017 | Varetti | |
| 2017/0036404 | A1 | 2/2017 | Rengers et al. | |
| 2017/0050270 | A1* | 2/2017 | Miyano | B65G 33/08 |
| 2017/0057013 | A1 | 3/2017 | Gillespie et al. | |
| 2017/0072463 | A1 | 3/2017 | Ng et al. | |
| 2017/0072636 | A1* | 3/2017 | Ng | B29C 64/321 |
| 2017/0072643 | A1* | 3/2017 | Ng | B29C 64/232 |
| 2017/0157805 | A1* | 6/2017 | Lind | B33Y 40/00 |
| 2017/0182556 | A1 | 6/2017 | Ramaswamy et al. | |
| 2017/0203363 | A1 | 7/2017 | Rowland et al. | |
| 2018/0186073 | A1* | 7/2018 | Dial | B33Y 30/00 |
| 2018/0222116 | A1 | 8/2018 | Ng et al. | |
| 2018/0326657 | A1* | 11/2018 | Iwase | B29C 64/329 |
| 2019/0060998 | A1* | 2/2019 | Kelkar | B33Y 40/00 |
| 2019/0105837 | A1 | 4/2019 | Zehavi et al. | |
| 2019/0126552 | A1* | 5/2019 | Merz | B29C 64/153 |
| 2019/0143595 | A1* | 5/2019 | Yao | B33Y 10/00 |
| | | | | 425/174.4 |
| 2019/0351667 | A1 | 11/2019 | Ng et al. | |
| 2020/0238432 | A1* | 7/2020 | Hayashi | B29C 64/209 |
| 2021/0154931 | A1 | 5/2021 | Zehavi et al. | |

FOREIGN PATENT DOCUMENTS

| | | |
|---|---|---|
| JP | 2006-205456 | 8/2006 |
| WO | WO 2015/038072 | 3/2015 |

* cited by examiner

REMOVABLE UNIT FOR SELECTIVE POWDER DELIVERY FOR ADDITIVE MANUFACTURING

TECHNICAL FIELD

This specification relates to additive manufacturing, also known as 3D printing.

BACKGROUND

Additive manufacturing (AM), also known as solid free-form fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

In one aspect, a dispensing system for an additive manufacturing apparatus includes a frame and a powder reservoir attached to the frame and configured to store powder to be dispensed over a top surface of a platen. The dispensing system also includes an array of dispensing units releasably coupled to the frame of the dispensing system. Each dispensing unit includes a motor and a nozzle block secured to the motor. The nozzle block has a passage therethrough that defines a nozzle and provides a respective path for the powder to flow from the powder reservoir through the nozzle to the top surface of the platen. Each dispensing unit also includes a valve positioned in the passage in the nozzle block. The valve is connected to the motor so that the valve is drivable by the motor to controllably release powder through the nozzle.

Implementations may include one or more of the following features.

The frame of the dispensing system may include a base plate releasably attached to the frame. The base plate may be configured to at least partially support multiple dispensing units of the array of dispensing units. The respective nozzle blocks of the multiple dispensing units may be disposed between the base plate and a base of the powder reservoir that contacts the respective nozzle blocks to prevent the multiple dispensing units from moving vertically with respect to the top surface of the platen. The multiple dispensing units may be releasably coupled to the base plate with a mechanical fastener to prevent the dispensing unit from moving horizontally with respect to the top surface of the platen.

The valve may include a powder wheel connected to the motor. The powder wheel may have a plurality of troughs on surface of the powder wheel to deliver the powder from the powder reservoir to the top surface through the respective path when the powder wheel is rotated by the motor.

Each nozzle may be positioned in an arrangement that, in combination with the nozzles of the other dispensing units, continuously spans at least a portion of a width of the top surface. Each of the respective nozzle blocks may be releasably attachable to the frame of the dispensing system. The dispensing unit further may include a belt-driven wheel axially connected to the valve. The belt-driven wheel may be configured to be driven by a belt connected to the motor.

The powder reservoir may be a hopper that includes a paddle wheel or agitator along a width of the hopper. The paddle wheel or agitator may be configured to distribute the powder uniformly across the nozzles.

The nozzles may be arranged in a single row. The nozzles may be positioned at a base of the powder reservoir. The array of dispensing units may include a first row of dispensing units opposite a second row of dispensing units. The two rows of dispensing units may be disposed at a same elevation with respect to the platen and may be arranged in a staggered configuration such that the nozzle blocks of the dispensing units of the first row alternate, along a width of the top surface, with the nozzle blocks of the dispensing units of the second row. The motors in the first row may be disposed adjacent to each other and the motors of the second row are disposed adjacent to each other.

The frame may include an enclosure that houses the array of dispensing units. The system also includes a heat shield disposed under the frame of the dispensing system to protect the dispensing system from overheating. Each powder wheel may be positioned between an inlet and an outlet of a respective nozzle. Each motor may be coupled to a tachometer configured to detect a stall condition.

In another aspect, an additive manufacturing system that includes a platen to support an object during fabrication and a dispensing system for an additive manufacturing apparatus. The dispensing system includes a frame, a powder reservoir attached to the frame and configured to store powder to be dispensed over a top surface of the platen, and an array of dispensing units releasably coupled to the frame of the dispensing system. Each dispensing unit includes a motor, and a nozzle block secured to the motor. The nozzle block has a passage therethrough that defines a nozzle and provides a respective path for the powder to flow from the powder reservoir through the nozzle to the top surface of the platen. Each dispensing unit also includes a valve positioned in the passage in the nozzle block. The valve is connected to the motor so that the valve is drivable by the motor to controllably release powder through the nozzle. The additive manufacturing system also includes an actuator coupled to the frame to drive the frame, the powder reservoir, and array of dispensing units laterally across the top surface of the platen. The additive manufacturing system also includes an energy source to selectively fuse powder dispensed over the top surface of the platen.

Implementations may include one or more of the following features.

The array of dispensing units extends along a first axis, and the actuator may be configured to drive the frame along a second axis perpendicular to the first axis. The nozzles may be arranged in a single row. The nozzles may be positioned at a base of the powder reservoir. The array of dispensing units may include a first row of dispensing units opposite a second row of dispensing units. The two rows of dispensing units may be disposed at a same elevation with respect to the platen and arranged in a staggered configuration such that the nozzle blocks of the dispensing units of the first row alternate, along a width of the top surface, with the nozzle blocks of the dispensing units of the second row.

The motors in the first row may be disposed adjacent to each other and the motors of the second row are disposed adjacent to each other.

In another aspect, a method of maintenance for an additive manufacturing system includes determining that a respective nozzle of a plurality of nozzles in the additive manufacturing system requires maintenance. The method also includes removing a respective dispensing unit from an array of dispensing units of the additive manufacturing system from a frame while a remainder of the dispensing units remain releasably coupled to the frame, the respective dispensing unit corresponding to the respective nozzle from the plurality of nozzles. The method also includes installing a replacement dispensing unit onto the frame in the position for the respective dispensing unit.

Advantages of the foregoing may include, but are not limited to, the following. Compared to conventional powder dispensing system, the disclosed techniques are more efficient. Conventional dry powder recoating does not provide spatial selective dispensing and layering to form a uniform region on a powder bed in metal 3D printing systems. In conventional 3D printers, a pool of powders is provided in front of a blade recoater or roller prior to the spreading. A drawback of conventional recoating setup is the excessive use of powder per recoating process. The excessive use increases the chances of subjecting subsequent reclaimed powder to be exposed to spatter, metal condensate, sintering phenomenon, oxygen contamination, potential changes in crystallographic properties, etc. These effects have direct impact to flowability of powder, fusing behavior, and final part quality.

The disclosed selective powder dispensing approach, with spreading and/or compaction, allows dispensing of powder as required. The disclosed "dispense on demand" approach only dispenses powder as necessary to form the desired region of build on a powder bed.

Accordingly, the efficiency of forming an object and increase overall throughput of additive manufacturing can be increased. The disclosed dispensing system can include several paths through which powder can be dispensed in parallel onto a platform of the additive manufacturing apparatus. These multiple available paths can be independently controlled such that the placement of powder onto the build platform can be controlled. Accordingly, the dispensing system can dispense powder only to where powder is needed. The disclosed techniques can thus reduce or avoid wasting expensive material, e.g., metal powder, used in additive manufacturing, thus saving cost. In addition, the disclosed techniques can ensure high quality recoated layer, thus leading to more uniform powder layer thickness and compaction. The disclosed techniques can allow more predictable powder fusing under various lasing conditions, which can lead to better quality of the end product.

Additionally, in high yield printing processes, nozzles can be clogged and interrupt the printing process. Because the nozzle blocks are quickly removable, the dispensing system of the present invention allows the clogged nozzle blocks to be quickly replaced or maintained. The dispensing system of the present disclosure also allows repairing of block containing a clogged nozzle while the printing process is still running using a replacement block.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Additive manufacturing (AM) apparatuses can form an object by dispensing and fusing successive layers of a powder on a build platform. Control of the area on the build stage on which powder is dispensed is desirable. A controllable dispenser can permit control of the geometry of the object, or simply be used to avoid dispensing powder in areas of the build platform that will not support the object, thus reducing the consumption of powder.

One potential problem is that nozzles in the dispenser can become clogged. However, if the entire dispenser is taken off-line for repair, valuable manufacturing time can be lost. By making nozzle blocks that are quickly removable, the present dispensing system allows the clogged nozzle blocks to be quickly replaced or maintained.

Additive Manufacturing Apparatuses

Figure 1A:
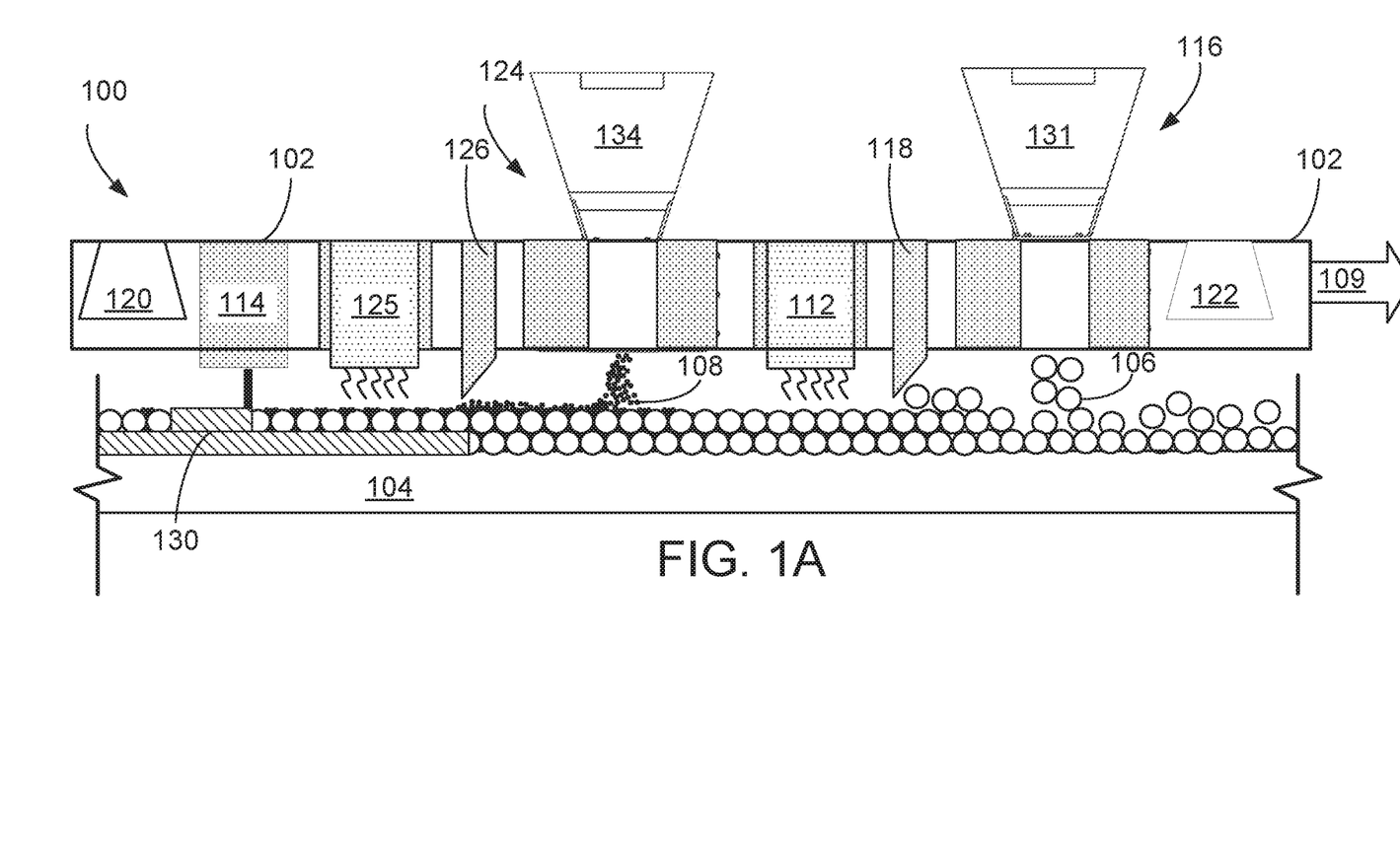
FIG. 1A is a schematic side view of an example of an additive manufacturing apparatus.

FIG. 1A shows a schematic side view of an example additive manufacturing (AM) apparatus 100 that includes a dispensing system for dispensing of powder to form an object during a build operation. The apparatus 100 includes a printhead 102 and a build platform or platen 104 (e.g., a build stage). The printhead 102 dispenses a powder 106 and, optionally, fuses the powder 106 dispensed on the platform 104. Optionally, as described below, the printhead 102 can also dispense and/or fuse a second powder 108 on the platform 104.

Figure 1B:
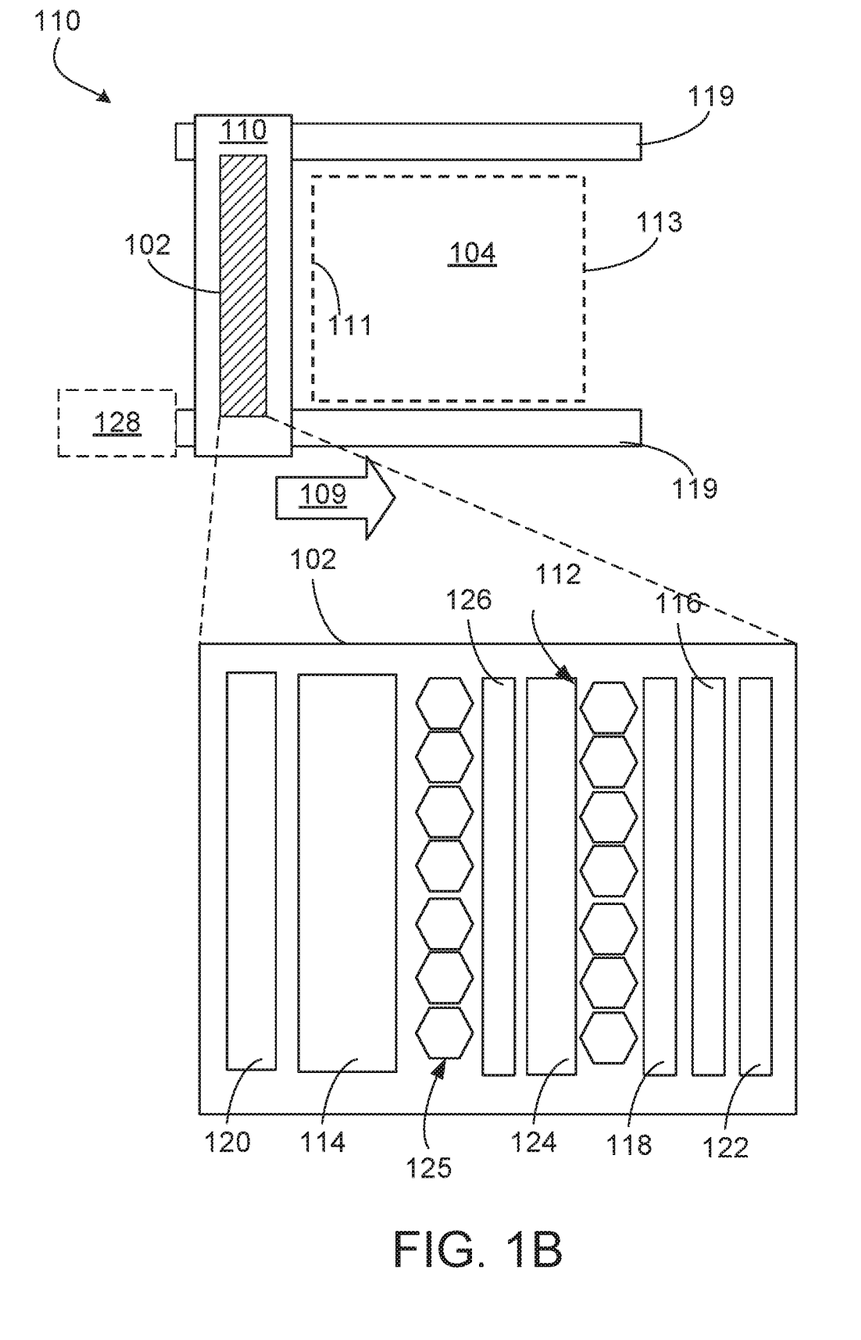
FIG. 1B is a schematic top view of the additive manufacturing apparatus of FIG. 1A.

Referring to FIGS. 1A and 1B, the printhead 102 is supported on a support 110 configured to traverse the platform 104. The support 110 can include a horizontally extending platform on which the printhead or print heads are mounted. For example, the support 110 can be driven along one or more rails 119 by a linear actuator and/or motor so as to move across the platform 104 along a first axis parallel to a forward direction 109, referred to as lengthwise. The support 110 can be a gantry supported on two opposite sides, e.g., by two rails 119, as shown in FIG. 1B. Alternatively, the support 110 can be held in a cantilever arrangement on a single rail.

As shown in FIG. 1B, the printhead 102 can span the entire width of the build platform 104. Alternatively, the support 110 can instead or in addition include two or more smaller printheads that move in the lateral direction of the build platform 104.

In the example as shown in FIG. 1B, the printhead 102 can scan in the forward direction 109 along the build platform 104. As the printhead 102 travels across the build platform 104 from a first end 111 to a second end 113, the printhead 102 can deposit a layer of powder. Then the printhead 102 can return to the first end 111. After the layer has been selectively fused, the printhead 102 can travel across the build platform 104 again in the forward direction 109 for a second time to deposit a second layer of powder.

The printhead 102 includes at least a first dispensing system 116 to selectively dispense powder 106 on the build platform 104.

The apparatus 100 also includes an energy source 114 to selectively add energy to the layer of powder on the build platform 104. The energy source 114 can be incorporated into the printhead 102, mounted on the support 110, or be mounted separately, e.g., on a frame supporting the build platform 104, or on chamber wall that surrounds the build platform 104, or on a separately movable support.

In some implementations, the energy source 114 can include a scanning laser that generates a beam of focused energy that increases a temperature of a small area of the layer of the powder. The energy source 114 can fuse the powder by using, for example, a sintering process, a melting process, or other process to cause the powder to form a solid mass of material. In some cases, the energy source 114 can include an ion beam or an electron beam.

The energy sources 114 can be positioned on the printhead 102 such that, as the printhead 102 advances in the forward direction 109, the energy sources can cover lines of powder dispensed by the dispensing system 116. When the apparatus 100 includes multiple dispensing systems, the printhead 102 can also optionally include an energy source for each of the dispensing systems. If the apparatus includes multiple heat sources, the energy sources can each be located immediately ahead of one of the heat sources.

Optionally, the apparatus can include a heat source 112 to direct heat to raise the temperature of the deposited powder. The heat source 112 can heat the deposited powder to a temperature that is below its sintering or melting temperature. The heat source 112 can be, for example, a heat lamp array. The heat source 112 can be incorporated into the printhead 102, mounted on the support 110, or be mounted separately, e.g., on a frame supporting the build platform 104 or on chamber wall that surrounds the build platform 104, or on a separately moveable support.

In some implementations, the build platform 104 may include a heater that can heat powder dispensed on the build platform 104. The heater can be an alternative to or in addition to the heat source 112 of the printhead 102.

Optionally, the printhead 102 and/or the support 110 can also include a first spreader 118, e.g., a compacting roller or a leveling blade, that cooperates with first the dispensing system 116 to compact and spread powder dispensed by the dispensing system 116. The spreader 118 can provide the layer with a substantially uniform thickness. In some cases, the first spreader 118 can press on the layer of powder to compact the powder.

The printhead 102 and/or the support 110 can also optionally include a first sensing system 120 and/or a second sensing system 122 to detect properties of the apparatus 100 as well as powder dispensed by the dispensing system 116.

In some implementations, the printhead 102 includes a second dispensing system 124 to dispense the second powder 108. A second spreader 126 can operate with the second dispensing system 124 to spread and compact the second powder 108. The apparatus 100, e.g., the printhead 102 or the support 110, can also include a second heat source 125 that, like the first heat source 112, directs heat to powder in large areas of the build platform 104.

A controller 128 can coordinate the operations of the energy source 114, heat source 112 (if present), and dispensing system 116. The controller 128 can operate the dispensing system 116 to dispense the powder 106 and can operate the energy source 114 and the heat source 112 to fuse the powder 106 to form a workpiece 130 that becomes the object to be formed. The controller 128 can operate the first dispensing system 116 to control, for example, the thickness and the distribution of the powder 106 dispensed on the build platform 104.

The distribution of powder dispensed for each layer, e.g., the locations of the powder within each layer, can vary based on the implementation of the additive manufacturing apparatus. In some cases, the first dispensing system 116 can selectively dispense a layer of powders across the build stage such that some portions include powder and some portions do not include powder. In some implementations, the first dispensing system 116 can dispense a uniform layer of powder on the work surface.

Dispensing Systems

Figure 2:
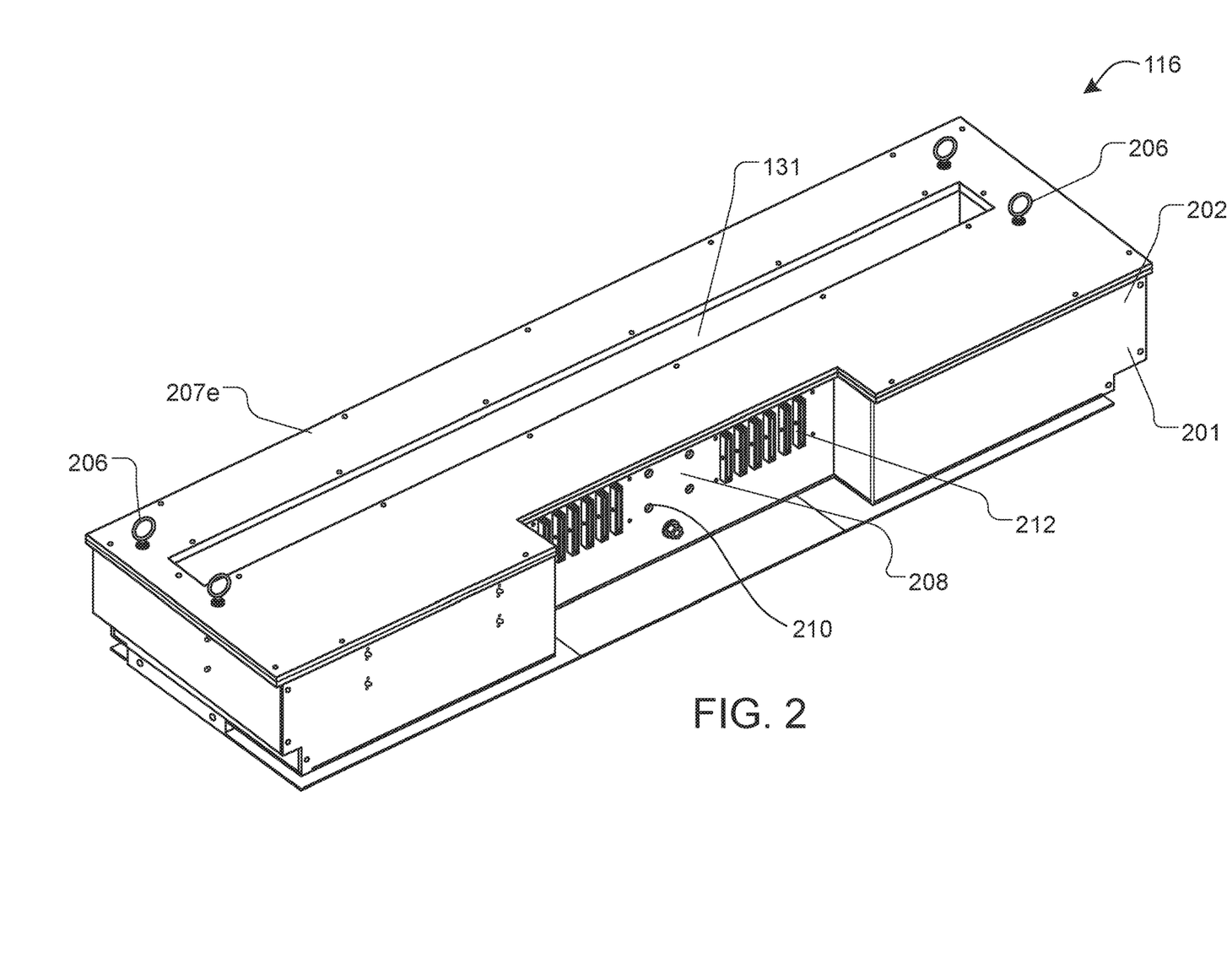
FIG. 2 illustrates an example dispensing system of the additive manufacturing apparatus.

FIG. 2 illustrates an example dispensing system of the additive manufacturing apparatus. The example dispensing system can be the dispensing system 116 (and/or, e.g., the second dispensing system 124) of FIG. 1. The dispensing system 116 includes an enclosure 202 housing various components for dispensing powder for additive manufacturing. The enclosure 202 can be formed by a frame 201 that defines walls to protect the interior components of the dispensing system 116. One of the components visible in FIG. 2 is a powder reservoir 131. In the example shown, the powder reservoir 131 is a container that may contain raw material, e.g., a powder, e.g., a metal powder, e.g., titanium powder, for additive manufacturing. The container for the powder reservoir 131 can be a hopper, e.g., tapered toward its bottom and configured to discharge its contents at the bottom, e.g., under the influence of gravity.

The dispensing system 116 can include one or more knobs 206, e.g., ring knobs, attached to a cover 207 of the dispensing system 116. Each of the knobs 206 can be used to lift the cover 207 to expose the interior components of the dispensing system.

The dispensing system 116 can include electrical connections 212, e.g., flat cable connectors. The dispensing system 116 can also include traversing hook-ups 208. The traversing hook-ups 208 can be used as or with adaptors or interfaces (not shown) to attach the dispensing system 116 to a traversing gantry or mechanical motion assembly that moves the dispensing system 116 across a substrate or surface to selectively dispense powders. The electrical connectors 212 can receive electrical power and instructions from respective electrical cables to operate the components of the dispensing system 116. For example, as shown in FIG. 1B, the controller 128 can send instructions to the dispensing system 116 through the cables to control the dispensing of powder on the platform.

The dispensing system 116 can include one or more purge ports 210 through which the dispensing system 116 can be flushed with inert gas to keep oxygen level inside the enclosure 202 to a level below a threshold. For example, the dispensing system 116 can include gas ports for connecting to an inert gas source, e.g., a nitrogen gas or argon cylinder or pump that, during operation, receives gas to be purged through purge port 210.

In some implementations, the dispensing system 116 can include coolant ports for connecting to a coolant source, e.g., a water pump that keeps temperature of the dispensing system 116 below a threshold temperature.

Figure 3A:
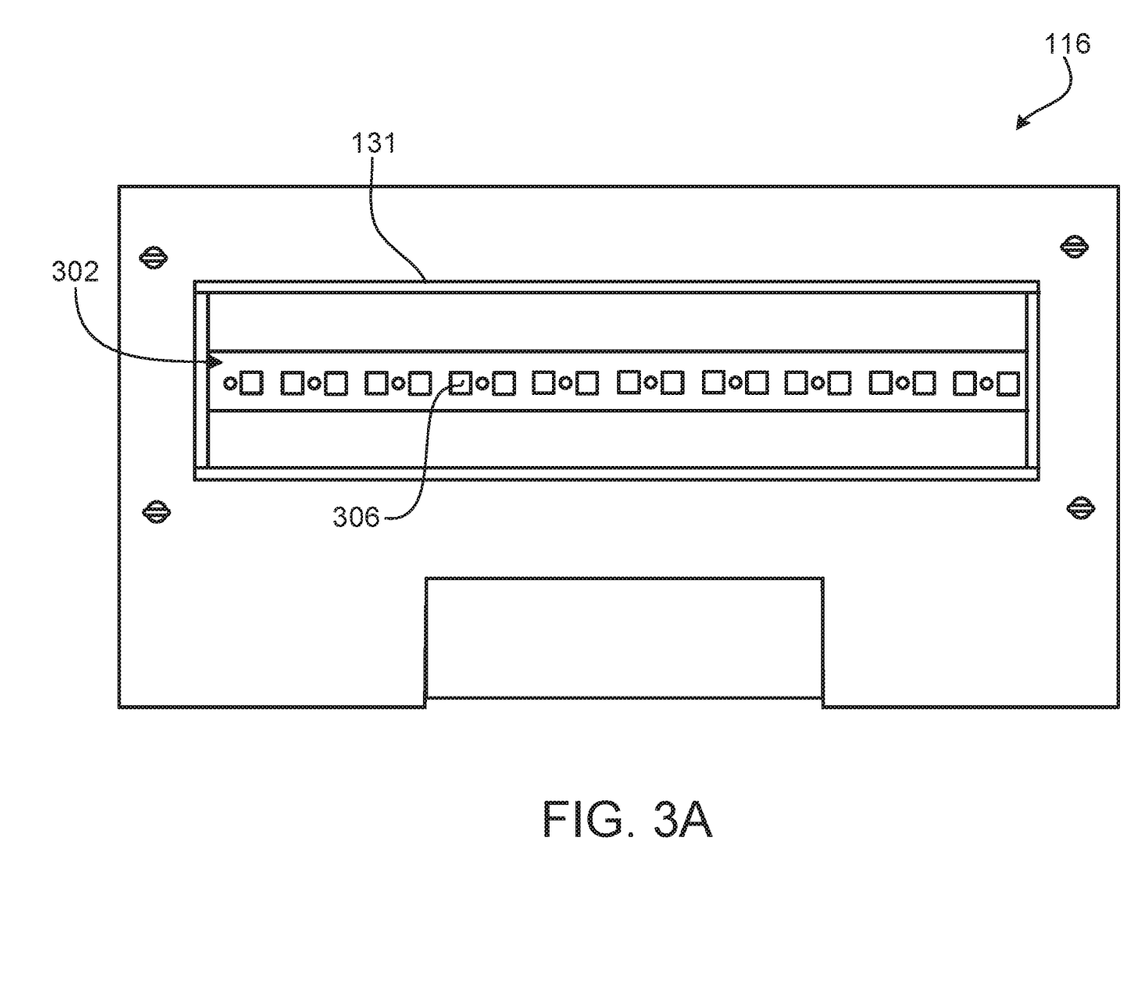
FIG. 3A is a top schematic view of the example dispensing system of FIG. 2.

FIG. 3A is a top schematic view of an example dispensing system 116. In this view, a top side of a nozzle array 302 at the bottom or at a base of the powder reservoir 131 is visible. In particular, the inlets for the nozzles 306 in the array 302 are visible. The nozzle array 302 includes multiple nozzles 306 that allow powder to flow from the powder reservoir 131 to a top surface of a platen where an object is to be printed from the powder. The nozzles 306 can be arranged in a single row. The nozzles 306 continuously cover at least a portion of the width, e.g., the entire width, of the top surface of the platen. Accordingly, when the dispensing system 116 sweeps along length of the top surface of the platen, the nozzle array 302 can sweep the entire area of the top surface.

In the example shown in FIG. 3A, the inlets are squares, but other suitable shapes, e.g., circular, hexagonal, or rectangular, can be used. The inlets of the nozzles 306 a can have a size of between 10 microns to 1 millimeter across. The inlets of the nozzles in the array 302 can have a uniform size.

The nozzles can be positioned in an arrangement that has one or more rows. In the example shown, the nozzles 306 are arranged in one row. As further described in detail below with respect to FIG. 8, the electric motors disposed on one side of the powder reservoir 131 are positioned in a staggered arrangement with the electric motors on the other side of the powder reservoir 131 to form a continuous row of alternating nozzles 306 to continuously cover at least a portion of the width of the top surface of the platen.

Each nozzle 306 in the nozzle array 302 can be individually controlled, such that when the dispensing system 116 sweeps along the length, flow of the powder can be controlled. The controlled flow allows the dispensing system 116 to dispense powder only to portions of the object to be printed that are solid.

Figure 3B:
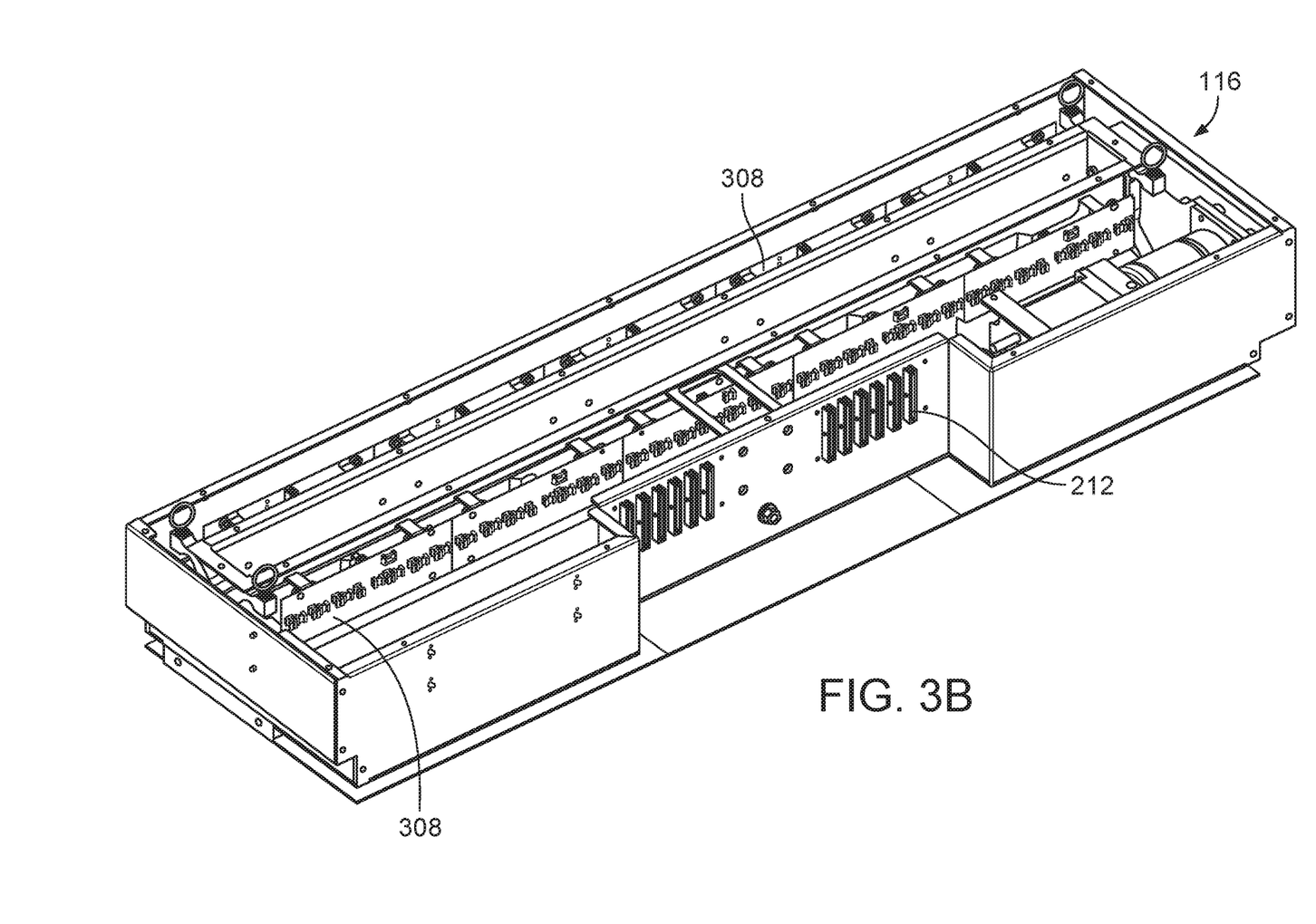
FIG. 3B is a perspective view of an example dispensing system without a top cover.

Referring also to FIG. 3B, the interior component of the dispensing system 116 includes printed circuit boards 308, e.g., powder distribution circuit boards or break-out boards. At least one circuit board 308 is disposed on each longitudinal side of the powder reservoir 131. Each circuit board 308 individually controls and provides power to electric motors (see FIG. 8) that are disposed under the circuit boards 308. For example, the circuit boards 308 can be electrically coupled to the electrical connectors 212. The circuit boards 308 can be arranged vertically (as shown in FIG. 3B) or horizontally.

Figure 4A:
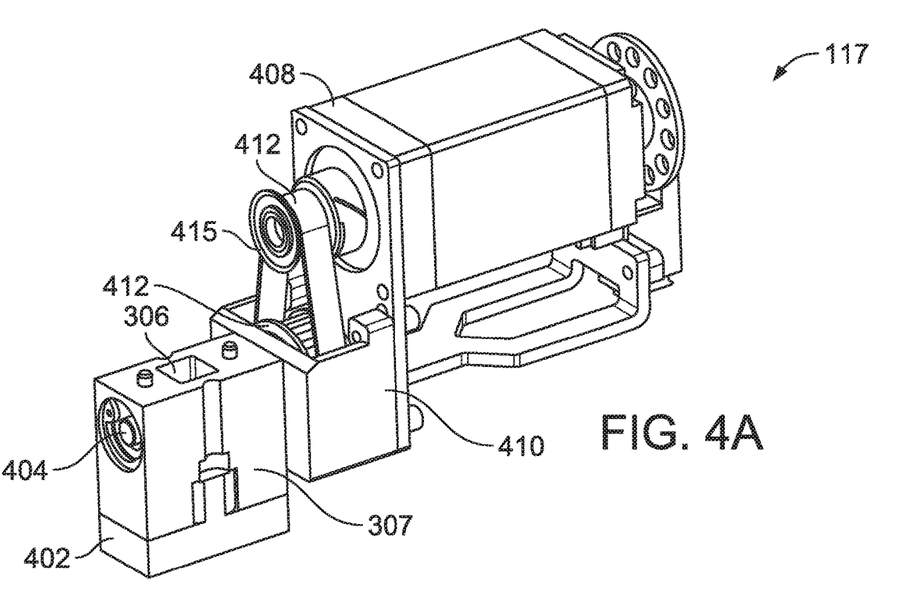
FIG. 4A is a front perspective view of an example hopper-wheel assembly or dispensing unit of an example dispensing system.

FIG. 4A is a front perspective view of removable dispensing unit 117 from an example dispensing system 116. The dispensing system 116 includes multiple dispensing units 117, arranged in one or two rows. As further described in detail with respect to FIG. 8, each dispensing unit 117 can be removably attached to the frame or to the powder reservoir of the dispensing system.

Each dispensing unit 117 can control dispensing of powder from a single nozzle 306. The dispensing unit 117 includes an electric motor 408, a nozzle block 307 and a valve or powered wheel 404. The dispensing unit 117 can have a transmission mechanism, e.g., a belt, a gear, or a worm drive to drive the powder wheel 404. FIG. 4A shows the motor 408 configured as a belt drive motor but the motor 408 can be configured as a direct drive motor.

As shown below in FIG. 8, the belt-driven configuration of the dispensing unit 117 can help reduce the vertical footprint of the dispensing system 116. The motor 408 includes a drive wheel or pulley 415 connected, through a belt 412, to a belt-driven wheel or pulley 412. The belt-driven wheel 412 is disposed inside a wheel housing 410 attached, e.g., permanently attached, to the nozzle block 307. The nozzle block 307 is attached to a bolt-on nozzle block 402 that allows the dispensing unit 117 to be removably attached to the frame of the dispensing system. For example, the nozzle block 307 has a threaded hole 405 that corresponds with a hole of the bolt-on nozzle block 402 to attach the bold-on nozzle block 402 to the nozzle block 307.

Figure 4B:
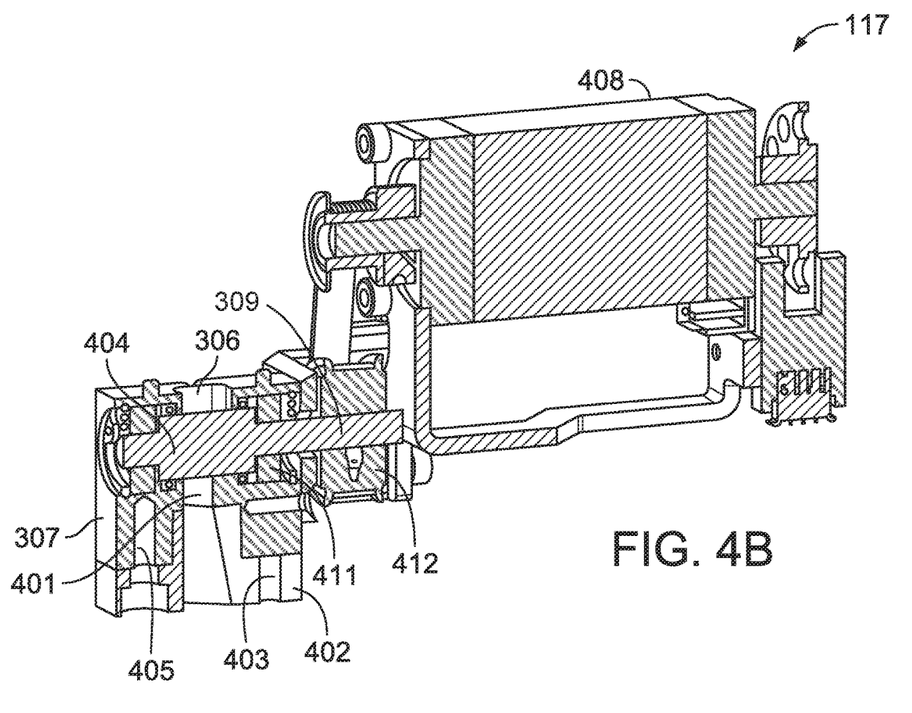
FIG. 4B is a side perspective cross-sectional view of the dispensing unit of FIG. 4A.

FIG. 4B is a side perspective cross-sectional view of the dispensing unit 117 of FIG. 4A. As shown above with respect to FIG. 3A, nozzles 306 are positioned at the bottom of the powder reservoir 131. The nozzle block 307 has a passage therethrough that defines the nozzle 306, e.g., a single nozzle 306, and provides a respective path for the powder to flow.

The powder valve or powder wheel 404 is positioned in the passage 401 provided by the nozzle 306. For example, each nozzle 306 has a powder wheel 404 inside the nozzle 306 between an inlet of the nozzle and an outlet of the nozzle. The powder wheel 404 is axially connected by a drive shaft 309 to the belt-driven wheel 412 that is rotated by the motor 408. The motor 408 can be an individually controllable brushless motor, e.g., a stepper motor. The powder wheel 404, when rotated by the motor 408, allows powder to flow through the nozzle 306. A rotation speed of the powder wheel 404 corresponds to the flow rate, where, up to a limit, higher rotation speed correspond to higher flow rate. The powder wheel 404, when not rotating, prevents powder from flowing through the nozzle 306. Thus, when the powder wheel 404 is rotated, powder flows from the inlet of the nozzle 306 though an outlet in the bolt-on nozzle block 402 to fall on the printing platform.

Figure 5:
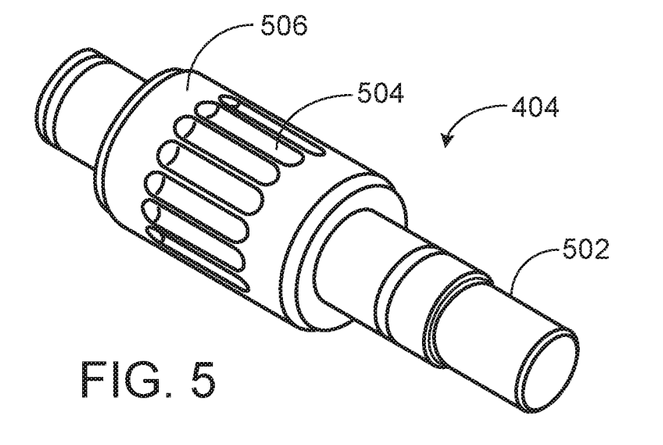
FIG. 5 illustrates an example powder wheel.

FIG. 5 illustrates an example powder wheel 404. Other powder wheels of the dispensing system can have a similar structure. The powder wheel 404 can have an axle 502 that is coupled (e.g., coupled directly or indirectly) to the driving motor. The powder wheel 404 can rotate about the longitudinal axis of the axle 502. The active portion of the powder wheel 404, i.e., the portion that will contact the powder, can include a cylindrical surface 506 that has one or more troughs 504. The cylindrical surface 506 can have a larger diameter than the axle 502. Each trough 504 can be arranged parallel or generally parallel to the axle 502. The length of each trough 504 can correspond to a width or diameter of a nozzle, e.g., the nozzle 306 of FIG. 3A. The width of each trough 504 can be selected based on the size of the powder to be dispensed, such that at least one powder particle can fit into the width of the trough 504. Likewise, the depth of each trough 504 can be selected based on the powder to be dispensed, such that at least one powder particle can fit into the depth of the trough 504 without protruding from the surface 506 of the powder wheel 404. Spacing between troughs can correspond to desired spatial resolution of the printing and speed of the driving motor.

When the powder wheel 404 rotates, powder will shift, e.g., under gravity, into the troughs 504. The one or more troughs 504 can transport the powder through the gap between the cylindrical surface 506 and the sidewalls of nozzle. Thus, rotation of the powder wheel 404 will cause the powder to flow from an inlet of a nozzle to an outlet of the nozzle, thus from the powder reservoir to the top surface of the platen. In general, the faster the rotation, the higher the flow rate. When the powder wheel 404 is stationary, the powder wheel 404 blocks passage of the powder. Accordingly, controlling rotation speed of the powder wheel 404 controls flow rate of the powder. The troughs 504 could be formed in the cylindrical surface 506 at an angle to the axis of rotation to form a partial or full spiral around the axis of rotation.

For solid parts of the object, the powder wheel rotates to allow the powder to flow from the powder reservoir to the top surface. For empty parts of the object, the powder wheel remains stationary to prevent the powder from flowing from the powder reservoir to the top surface.

Figure 6:
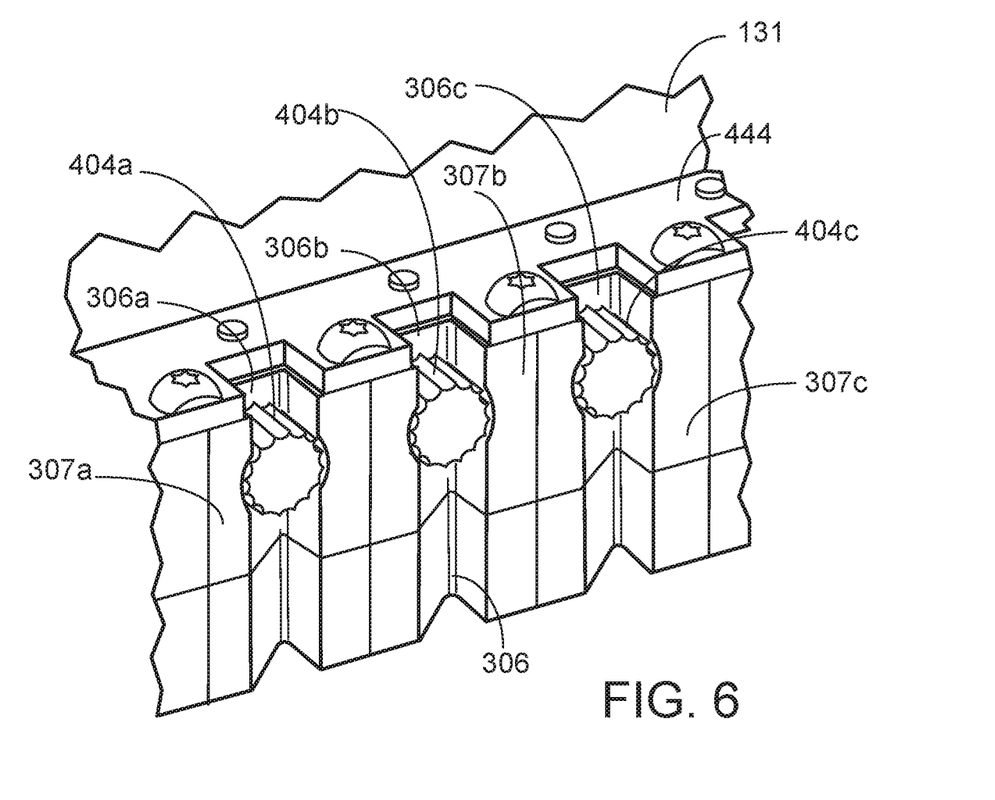
FIG. 6 illustrates an example arrangement of powder wheels in nozzles.

FIG. 6 illustrates an example arrangement of powder wheels 404a, 404b, and 404c arranged in respective nozzles 306a, 306b, and 306c. The nozzles 306a, 306b, and 306c extend from openings of a base 444 of the powder reservoir 131. The diameters of the powder wheels 404a, 404b, and 404c correspond to widths or diameters of the nozzles 306a, 306b, and 306c. In the example shown, the powder wheels 404a, 404b, and 404c are placed between inlets of the nozzles 306a, 306b, and 306c (at the top) and outlets of the nozzles 306a, 306b, and 306c (at the bottom). Space tolerance between the powder wheels and walls of their respective nozzles is configured to be smaller than diameter of powder particles. Accordingly, only powder in the troughs of the powder wheels can move from the inlets to the outlets. The limit in space tolerance prevents powder from leaking through space between the powder wheels and the walls.

The powder wheels 404a, 404b, and 404c and respective nozzle blocks 307a, 307b, and 307c can be part of opposed rows of dispensing units with the dispensing units 117 of one row alternating with the dispensing units of the opposite row. For example, a first powder wheel 404a and a third powder wheel 404c extend from a common side of the powder reservoir 131 and a second powder wheel 404b extends from an opposite side of the powder reservoir 131. However, the nozzles 306 of the dispensing units 117 can still be in a single linear row. For example, for successive dispensing units along the row of nozzles 306, the motor 408 and drive belt 412 can be positioned on alternating opposite sides of the row of nozzles 306.

Figure 7:
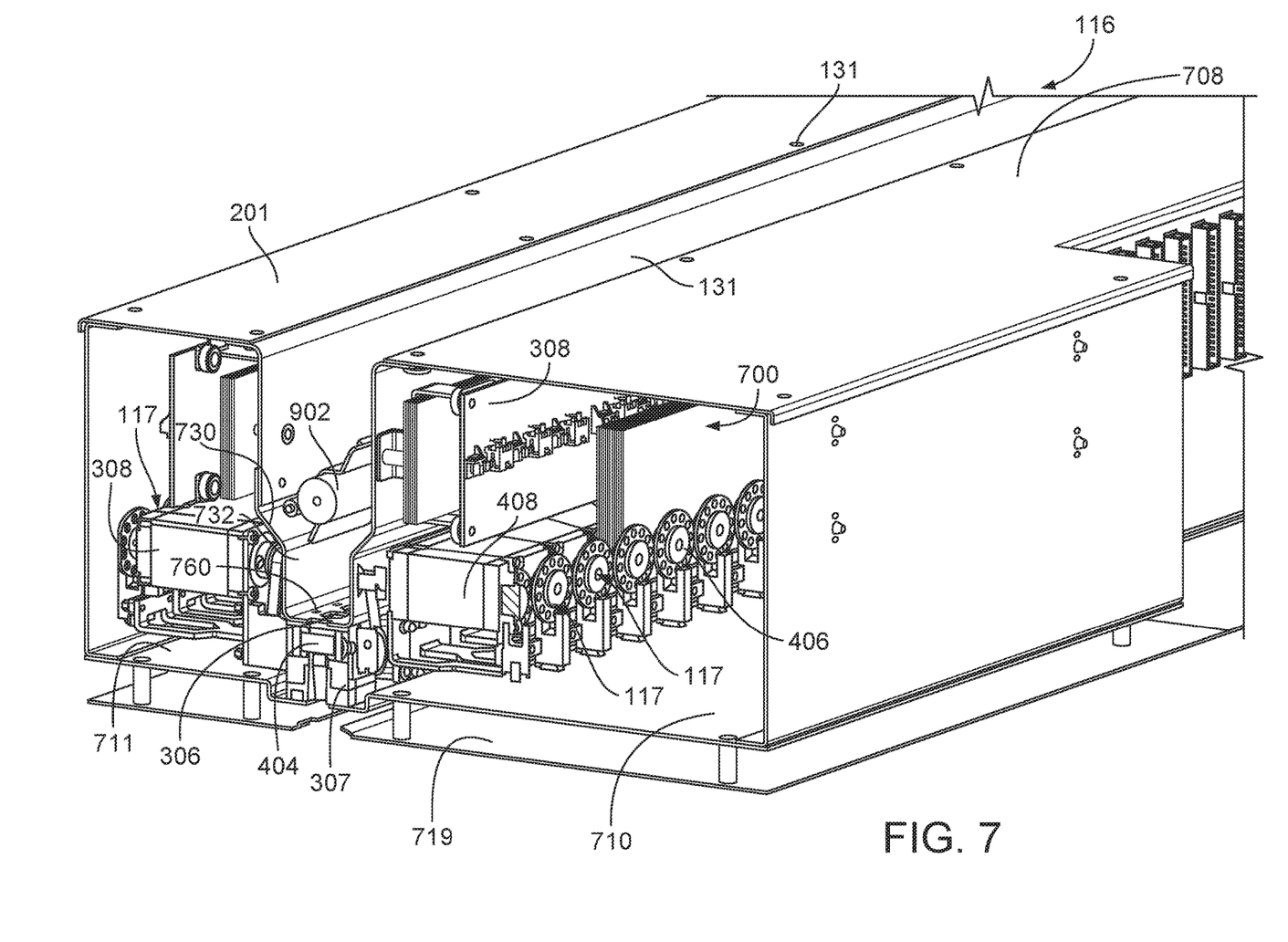
FIG. 7 illustrates components of an example dispensing system.

FIG. 7 is a cross-section view of the dispensing system 116. The dispensing system 116 includes a powder reservoir assembly 700. The powder reservoir 131 has, in side view, a funnel shape cross-section. Walls of the funnel guide powder downward toward the nozzle array 306. In particular, the powder reservoir 131 can include a middle portion 730 that defines the narrowing portion of the funnel and a lower portion 732 of uniform width.

The powder reservoir assembly 700 includes an array of dispensing units 117 releasably coupled to the frame 201 of the dispensing system 116. The frame 201 of the dispensing system 117 includes a first base plate 710 and a second base plate 711 releasably attached to the frame. The first base plate 710 and second base plate 711 at least partially support a first row of dispensing units 117 with respective motors 408 disposed on one side of the powder reservoir 131 and a second row of dispensing units 117 with respective motors 408 positioned on the other side of the powder reservoir 131.

For example, the array of dispensing units 117 includes a first row of dispensing units 117 opposite a second row of dispensing units 117, the two rows disposed at a same elevation with respect to the build platform. The two rows of dispensing units 117 are arranged in a staggered configuration such that the nozzle blocks 307 of the dispensing units 117 of the first row alternate, along the width of the build platform, with the nozzle blocks 307 of the dispensing units 117 of the second row. The motors 408 in each row of dispensing units 117 are disposed adjacent to each other.

As shown in FIB. 8, the respective nozzle blocks 307 of each row of dispensing units 117 form one row of nozzle blocks 307 and are positioned between the base of the powder reservoir 131 (that contacts the respective nozzle blocks 307 on top) and the two base plates 710 and 711 to prevent the multiple dispensing units 317 from moving vertically with respect to the top surface of the build plate. Each nozzle block 307 has projections 760, e.g., pins, that extend vertically from a top surface of the nozzle block into a respective hole of the base of the powder reservoir to serve as detents to hold the nozzle blocks 397 (and by extension the dispensing units 117) in place.

The multiple dispensing units 117 are releasably coupled to at least one of the base plates 710 and 711. The dispensing units 117 are releasable coupled with a mechanical fastener, e.g., a screw, to prevent the dispensing unit 117 from moving horizontally or parallel with respect to the top surface of the platen. Releasable coupled indicates that the dispensing unit 117 can be removed from the remainder of the assembly by hand or using conventional tools, e.g., a screwdriver, without damage to the fastener, dispensing unit 117 or assembly.

Figure 8:
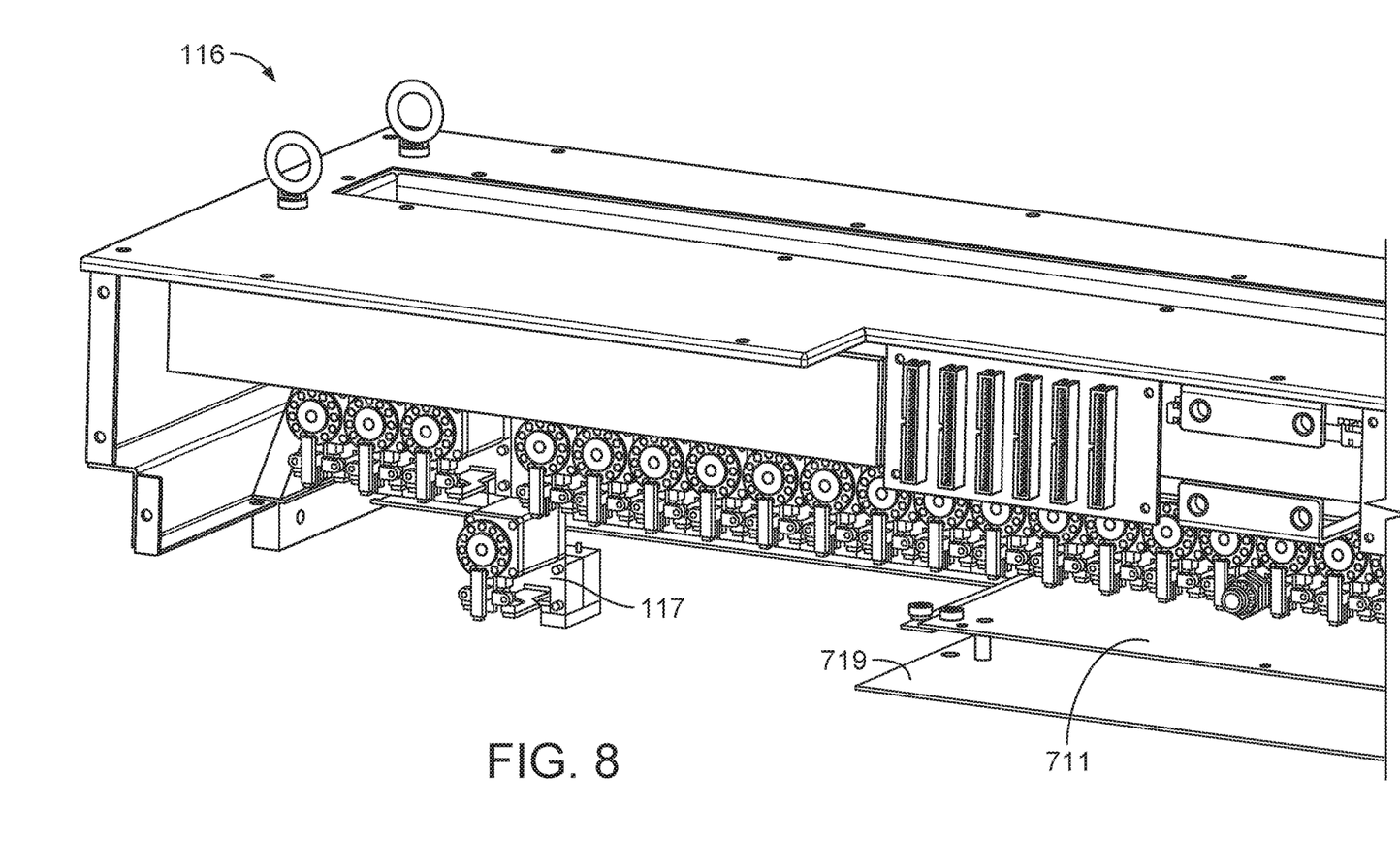
FIG. 8 is a perspective cross-section view of an example dispensing system.

Also referring to FIG. 8, at least one of the base plates 710 and 711 are removed from the frame 201 to remove one or more dispensing units. For example, referring back to FIG. 4B, the bolt-on nozzle block 402 of the dispensing unit 117 can have a threaded hole 403 that corresponds with an aperture of one of the base plates 710 and 711. The threaded hole 403 can receive a screw that fastens the dispensing unit 117 to the body of the dispensing system. Each dispensing unit 117 can be removed after removing at least one of the base plates by moving the dispensing unit 117 downward. Removing individual dispensing units 117 allows repairing or maintaining, e.g., unclogging, individual nozzle blocks, e.g., individual nozzles, quickly or while the process is still running using a replacement dispensing unit.

Referring back to FIG. 7, the dispensing system 116 also includes one or more heat shields or cooling plates 719 disposed under the frame 201 (e.g., under the removable base plates 710 and 711) to protect the dispensing system 116 from overheating. The cooling plate 719 can include a heat exchange element such as an air or liquid cooled tube that carries heat away from the dispensing system.

The powder reservoir 131 can have an agitator 902. The agitator 902 can be a paddle wheel or augur screw that oscillates (e.g., rotates back and forth about the long axis) to maintain the flowability of the powder. The agitator 902 can run along the width of the powder reservoir 131. The agitator 902 helps the powder spread evenly along width of the powder reservoir 131 such that flow of the powder through the active nozzles is not impeded.

The control and powder distribution circuit 308 controls individual motors 408 to rotate the powder wheel 404 of the dispensing units 117 located on the respective side of the powder reservoir 131. In some implementations, the control and powder distribution circuit 308 includes sensors configured to detect stalling of the powder wheels. For example, each powder wheel can be coupled to a tachometer 406. The tachometer 406 can measure the rotation speed, e.g., in rpm. If a powder wheel is stalled (e.g., either a complete stall or a speed reduction), e.g., due to uneven size or clump in the powder, a corresponding sensor can detect the stall. The control and powder distribution circuit 708 can submit information of the stall to a control device to stop printing, or to a display device notifying a user of an anomaly. Alternatively or in addition, the system can increase the rotation rate of adjacent powder wheels to increase powder delivery in immediately adjacent regions to compensate for the reduced powder delivery from the stalled powder wheel.

Figure 9A:
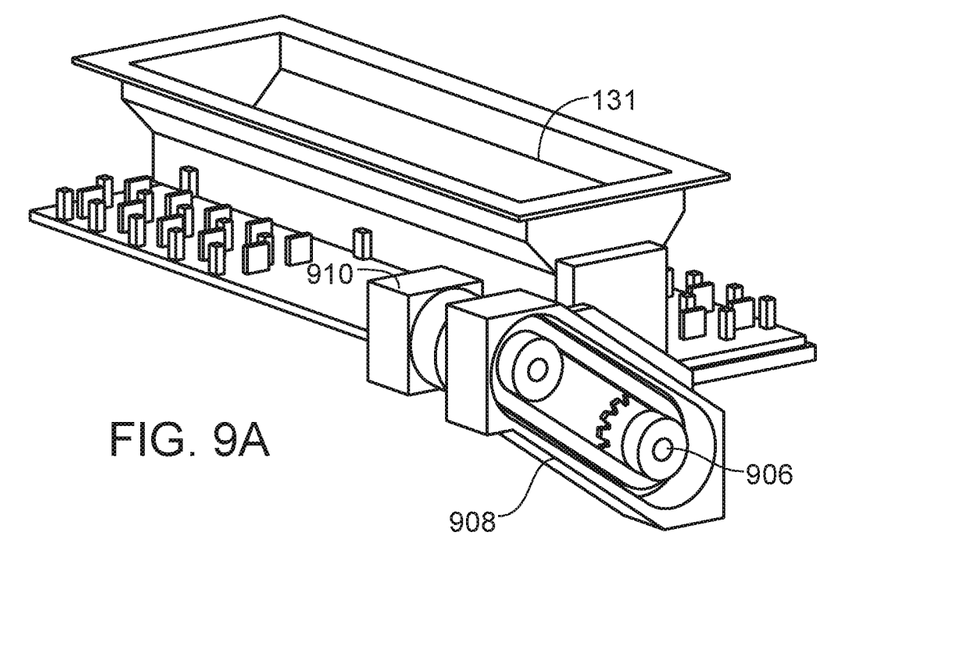
FIGS. 9A and 9B illustrate an example paddle wheel, gear box and drive mechanism.
Figure 9B:
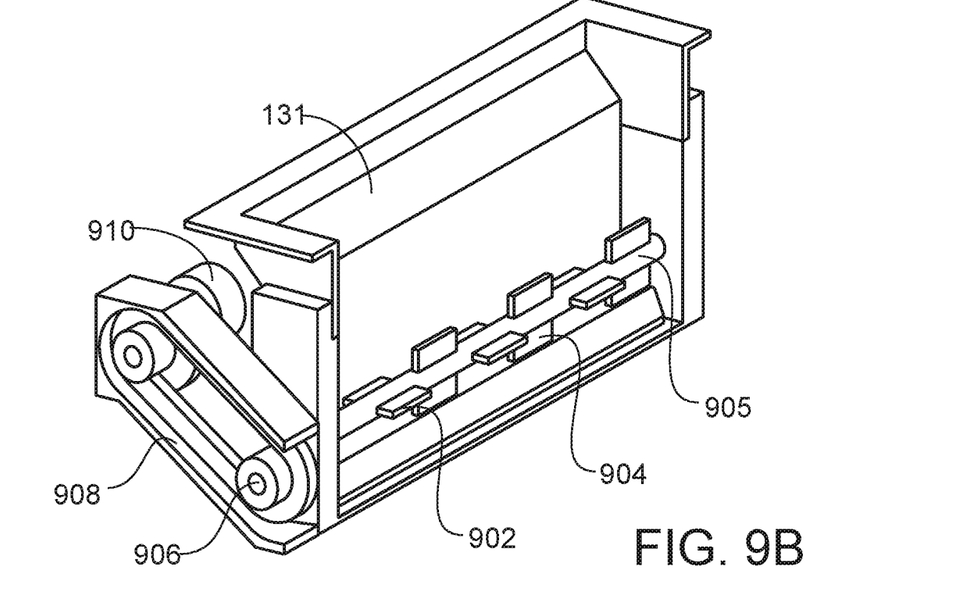

FIG. 9A illustrates an example paddle wheel, gear box and drive mechanism. The paddle wheel, gear box and drive mechanism can be mounted on the powder reservoir 131. As shown in FIG. 9B, a agitator 902 runs across width of the powder reservoir 131. As a paddle wheel, the agitator 902 has one or more paddles 904 that project outwardly from a rotatable axle 905. This stirs powder in the powder reservoir 131 so that powder is distributed evenly to the nozzles.

Operations of the Dispensing Systems

The dispensing systems described herein facilitate dispensing and compaction of powder onto the build platform of the apparatus. An example process of additive manufacturing can be performed by an AM apparatus including dispensing system, e.g., the apparatus 100 including the dispensing system 116 of FIG. 1A.

A powder reservoir of a powder dispensing system, e.g., a hopper, receives powder for printing an object. An agitator in the powder reservoir agitates the powder to maintain the powder in a flowable state. This permits the powder to distribute uniformly across an array of nozzles. The array of nozzles is coupled to the powder reservoir at the base of the powder reservoir. The nozzles are positioned in an arrangement, e.g., in one or more rows. In combination, the nozzles continuously span at least a portion of width of a top surface of a platen on which the object is to be printed.

The nozzles dispense the powder from the powder reservoir to the top surface. During dispensing, a respective powder wheel in each nozzle controls a respective flow rate of the powder for the nozzle. The apparatus forms the layer by moving the dispensing system across length of the top surface of the platen.

Each powder wheel can have multiple troughs on surface of the wheel for transporting the powder when the wheel rotates. Each powder wheel is coupled to a respective motor. Rotating speed and geometric shape of troughs of each powder wheel control the respective flow rate. For example, rotating a powder wheel allows the powder to flow from the powder reservoir to the top surface where a portion of the object requires comprises solid material. A stationary a powder wheel that does not rotate can prevent the powder from flowing from the powder reservoir to the top surface where the object is not being fabricated.

A cooling plate can be mounted on the dispensing system to cools the dispensing system.

Optionally, a spreader, e.g., a blade, a roller or both, levels and/or compacts the powder dispensed on the top surface.

The apparatus forms a layer of the object by fusing the leveled powder. For example, an energy beam, e.g., a laser beam, with controllable intensity can be scanned across the layer powder to selectively fuse portions of the powder corresponding to solid regions of the object being fabricated.

In some implementations, the apparatus has multiple dispensing systems. Each of the dispensing systems can dispense a different powder. At least one powder can be a metal powder.

More generally, referring to FIG. 1A, 1B, the controller 128 can operate the apparatus 100, and in particular, the dispensing system 116 to control the dispensing and compacting operations. The controller 128 can receive signals from, for example, user input on a user interface of the apparatus or sensing signals from sensors of the apparatus 100. The user input can CAD data indicative of the object to be formed. The controller 128 can use that CAD data to determine properties of the structures formed during additive manufacturing processes. Based on the CAD data, the controller 128 can generate instructions usable by each of the systems operable with the controller 128, for example, to dispense the powder, to fuse the powder, to move various systems of the apparatus 100, and to sense properties of the systems, powder, and/or the workpiece 130.

In an example process of dispensing and compacting the powder, powder particles are first loaded through the powder reservoir 131 of FIG. 2. The powder reservoir 131 can be a hopper serving as a reservoir for the powder. The powder particles travel through the powder reservoir 131 toward an array of nozzles. Powder wheels in the array of nozzles controls where on the top surface of the platen the powder is dispensed.

The controller can control the level of compaction, the location of powder dispensing, and the rate of powder dispensing based on the desired levels for each of those parameters included in the CAD data. In this regard, the controller can control the powder wheels to achieve these desired parameters. Furthermore, the controller can use the CAD data, which can specify the geometry of the object to be formed, to control where the powder is to be dispensed. While the controller can control a position of the dispensing system above the build platform to control where the powder is dispensed, the controller can also control where along the dispensing system the powder is dispensed.

Referring to FIGS. 1A and 1B, the controller can control other systems to perform operations to form the object. These systems include the printhead 102, the heat source 112, and the energy source 114 to fuse the powder dispensed by the dispensing system 116. After the dispensing system 116 has dispensed a layer of the powder, the controller can control the heat source 112 and the energy source 114 to cooperate to heat and fuse the powder within the layer. The controller can then control the dispensing system 116 to dispense another layer of the powder.

Controllers and computing devices can implement these operations and other processes and operations described herein. As described above, the controller 128 of the apparatus 100 can include one or more processing devices connected to the various components of the apparatus 100, e.g., actuators, valves, and voltage sources, to generate control signals for those components. The controller can coordinate the operation and cause the apparatus 100 to carry out the various functional operations or sequence of steps described above. The controller can control the movement and operations of the systems of the printhead 102. The controller 128, for example, controls the location of feed material, including the first and second powder particles. The controller 128 also controls the intensity of the energy source based on the number of layers in a group of layers to be fused at once. The controller 128 also controls the location where energy is added by, for example, moving the energy source or the printhead.

The controller 128 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 128 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 128, e.g., as controlled by firmware or software, can interpret the data object received from the computer to generate the set of signals necessary to control the components of the apparatus 100 to fuse the specified pattern for each layer.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The printhead of FIG. 1A includes several systems that enable the apparatus 100 to build objects. In some cases, instead of a printhead, an AM apparatus includes independently operated systems, including independently operated energy sources, dispensers, and sensors. Each of these systems can be independently moved and may or may not be part of a modular printhead. In some examples, the printhead includes only the dispensers, and the apparatus include separate energy sources to perform the fusing operations. The printhead in these examples would therefore cooperate with the controller to perform the dispensing operations.

While the operations are described to include a single size of powder particles, in some implementations, these operations can be implemented with multiple different sizes of powder particles. While some implementations of the AM apparatus described herein include two types of particles (e.g., the first and the second powder particles), in some cases, additional types of particles can be used. As described above, the first powder particles have a larger size than the second powder particles. In some implementations, prior to dispensing the second powder particles to form a layer, the apparatus dispenses third powder particles onto the platen or underlying previously dispensed layer.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene, as well as composite particles.

A number of implementations have been described. Nevertheless, it will be understood that various modifications may be made. For example,

- Various components described above as being part of the printhead, such as the dispensing system(s), spreader(s), sensing system(s), heat source and/or energy source, can be mounted on the gantry instead of in the printhead, or be mounted on the frame that supports the gantry.
- The dispensing system(s) can each include more than two rows of nozzles arranged in a staggered configuration.
- The powder reservoir can have different shapes and sizes in different implementations. The power source can be a funnel shaped round container. In some implementations, the powder reservoir can include a tube supplying powder to rows of nozzles.
- Continuous span across the width can be achieved in part by the spreading of the powder on the top surface after the powder leaves the nozzles. Accordingly, nozzles may or may not be immediately aligned one next to another.
- In some implementations, the printhead can move along the support along a horizontal second axis perpendicular to the first axis, referred to as widthwise. Movement along both the first and second axes enables the printhead and its systems to reach different parts of the platform beneath the support. The movement of the printhead along the support and the movement of the support along the rails provide multiple degrees of freedom of mobility for the printhead. The printhead can move along a plane above and parallel to the build platform such that the printhead can be selectively positioned above a usable area of the build platform (e.g., an area where the powder can be dispensed and fused).
- The printhead and the support can cooperate to scan the usable area of the build platform, enabling the printhead to dispense powder along the build platform as needed to form the object. The printhead can scan in the forward direction along the build platform. After the printhead travels across the build platform from a first end to a second end of the build platform for a first time to deposit a first stripe of the layer of powder. Then the printhead can return to the first end, move in a lateral direction along the horizontal second axis, and begin a travel across the build platform again in the forward direction for a second time to deposit a second stripe on the build platform that is parallel to the first stripe. If the printhead dispenses two or more different sizes of powder, the printhead can dispense the two or more different powders during a single pass across the platform.

Accordingly, other implementations are within the scope of the claims.

What is claimed is:

1. A dispensing system for an additive manufacturing apparatus, the dispensing system comprising:
   a frame;
   a base plate releasably attached to the frame,
   a powder reservoir joined to the frame and configured to store powder to be dispensed over a top surface of a platen, wherein the powder reservoir has a base;

an array of dispensing units releasably coupled to the frame of the dispensing system, each dispensing unit including
a motor,
a nozzle block secured to the motor, the nozzle block having a passage extending through the nozzle block that defines a nozzle and provides a path for the powder to flow from the powder reservoir to the top surface of the platen, and
a valve positioned in the passage in the nozzle block and connected to the motor so that the valve is drivable by the motor to controllably release powder through the nozzle;
wherein the base plate at least partially supports multiple dispensing units of the array of dispensing units, and the nozzle blocks of the multiple dispensing units, which are partially supported by the base plate, contact the base of the powder reservoir to prevent the multiple dispensing units from moving vertically with respect to the top surface of the platen.

2. The dispensing system of claim 1, wherein the multiple dispensing units are releasably coupled to the base plate with a mechanical fastener to prevent the multiple dispensing units from moving horizontally with respect to the top surface of the platen.

3. The dispensing system of claim 1, wherein, for each of the dispensing units, the respective valve comprises a powder wheel connected to the respective motor, the respective powder wheel having a plurality of troughs on a surface of the respective powder wheel to deliver the powder from the powder reservoir to the top surface of the platen when the respective powder wheel is rotated by the respective motor.

4. The dispensing system of claim 3, wherein each respective powder wheel is positioned between an inlet and an outlet of the respective nozzle.

5. The dispensing system of claim 1, wherein the array of dispensing units continuously spans at least a portion of a width of the top surface of the platen, and wherein each of the respective nozzle blocks are releasably attachable to the frame of the dispensing system.

6. The dispensing system of claim 1, wherein each dispensing unit further comprise a belt-driven wheel that is axially connected to the respective valve and is configured to be driven by a belt connected to the respective motor.

7. The dispensing system of claim 1, wherein the powder reservoir is a hopper that includes a paddle wheel or agitator along a width of the hopper, the paddle wheel or agitator configured to distribute the powder uniformly across the array of dispensing units.

8. The dispensing system of claim 1, wherein the nozzles are arranged in a single row, the nozzles being positioned at the base of the powder reservoir.

9. The dispensing system of claim 1, wherein the array of dispensing units includes a first row of dispensing units opposite a second row of dispensing units, the two rows of dispensing units disposed at a same elevation with respect to the platen and arranged in a staggered configuration such that the nozzle blocks of the dispensing units of the first row alternate, along a width of the top surface, with the nozzle blocks of the dispensing units of the second row.

10. The dispensing system of claim 9, wherein the motors in the first row are disposed adjacent to each other and wherein the motors of the second row are disposed adjacent to each other.

11. The dispensing system of claim 1, wherein the frame comprises an enclosure housing the array of dispensing units.

12. The dispensing system of claim 1, further comprising a heat shield disposed under the frame of the dispensing system.

13. The dispensing system of claim 1, wherein each motor is coupled to a tachometer configured to detect a stall condition.

14. An additive manufacturing system, comprising:
a platen to support an object during fabrication;
a dispensing system for an additive manufacturing apparatus, the dispensing system including
a frame,
a base plate releasably attached to the frame,
a powder reservoir attached to the frame and configured to store powder to be dispensed over a top surface of the platen, wherein the powder reservoir has a has a base, and
an array of dispensing units releasably coupled to the frame of the dispensing system, each dispensing unit including
a motor,
a nozzle block secured to the motor, the nozzle block having a passage that defines a nozzle and provides a path for the powder to flow from the powder reservoir through the nozzle to the top surface of the platen, and
a valve positioned in the passage in the nozzle block and connected to the motor so that the valve is drivable by the motor to controllably release powder through the nozzle;
an actuator coupled to the frame to drive the frame, powder reservoir and array of dispensing units laterally across the top surface of the platen;
an energy source to selectively fuse powder dispensed over the top surface of the platen,
wherein the base plate at least partially supports multiple dispensing units of the array of dispensing units, and the nozzle blocks of the multiple dispensing units, which are partially supported by the base plate, contact the base of the powder reservoir to prevent the multiple dispensing units from moving vertically with respect to the top surface of the platen.

15. The system of claim 14, wherein the array of dispensing units extends along a first axis, and the actuator is configured to drive the frame along a second axis perpendicular to the first axis.

16. The system of claim 14, wherein the nozzles are arranged in a single row, the nozzles being positioned at the base of the powder reservoir.

17. The system of claim 14, wherein the array of dispensing units includes a first row of dispensing units opposite a second row of dispensing units, the two rows of dispensing units disposed at a same elevation with respect to the platen and arranged in a staggered configuration such that the nozzle blocks of the dispensing units of the first row alternate, along a width of the top surface, with the nozzle blocks of the dispensing units of the second row.

18. The system of claim 17, wherein the motors in the first row are disposed adjacent to each other and wherein the motors of in the second row are disposed adjacent to each other.

* * * * *

UNITED STATES PATENT AND TRADEMARK OFFICE
CERTIFICATE OF CORRECTION

| | |
|---|---|
| PATENT NO. | : 11,524,455 B2 |
| APPLICATION NO. | : 16/694144 |
| DATED | : December 13, 2022 |
| INVENTOR(S) | : Raanan Zehavi et al. |

It is certified that error appears in the above-identified patent and that said Letters Patent is hereby corrected as shown below:

In the Claims

Column 16, Line 18, in Claim 14, delete "has a has a" and insert --has a--.

Column 16, Line 62, in Claim 18, after "motors", delete "of".

Signed and Sealed this
Seventh Day of February, 2023

Katherine Kelly Vidal
*Director of the United States Patent and Trademark Office*